United States Patent [19]

Burgess et al.

[11] 4,000,788

[45] Jan. 4, 1977

[54] BELT-ON TREE STEP (BOTS)

[76] Inventors: John Alwyn Burgess, 114 Moore Ave.; Zeb Douglas Schofield, III, 273 Champion Drive, both of Opp, Ala. 36467

[22] Filed: Nov. 11, 1975

[21] Appl. No.: 630,153

[52] U.S. Cl. .................................................. 182/92

[51] Int. Cl.[2] .......................................... B60R 3/00

[58] Field of Search ............. 182/92; 248/216, 221, 248/226 R

[56] References Cited

UNITED STATES PATENTS 3,598,201 8/1971 Thurmond ......................... 182/92

FOREIGN PATENTS OR APPLICATIONS 140,087 6/1953 Austria ............................... 182/92

500,655 11/1954 Italy .................................... 182/92

*Primary Examiner*—Reinaldo P. Machado

[57] ABSTRACT

A portable step for climbing up and down elongated objects, such as trees and poles, is provided by a one-piece member formed to cooperate with a belt-type fastening means and is essentially T-shaped in cross-section with a horizontal leg portion constructed and arranged so that the step will not twist to the side when the user places his weight thereon.

1 Claim, 4 Drawing Figures

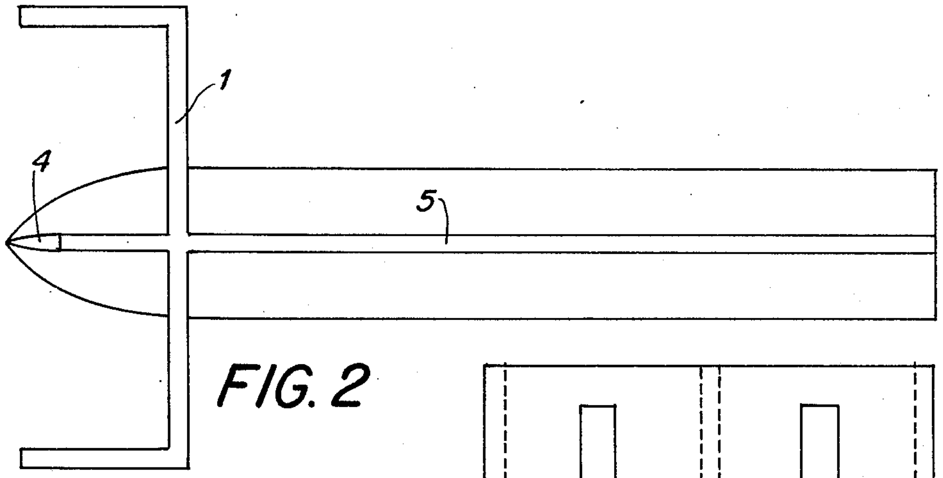
FIG. 2
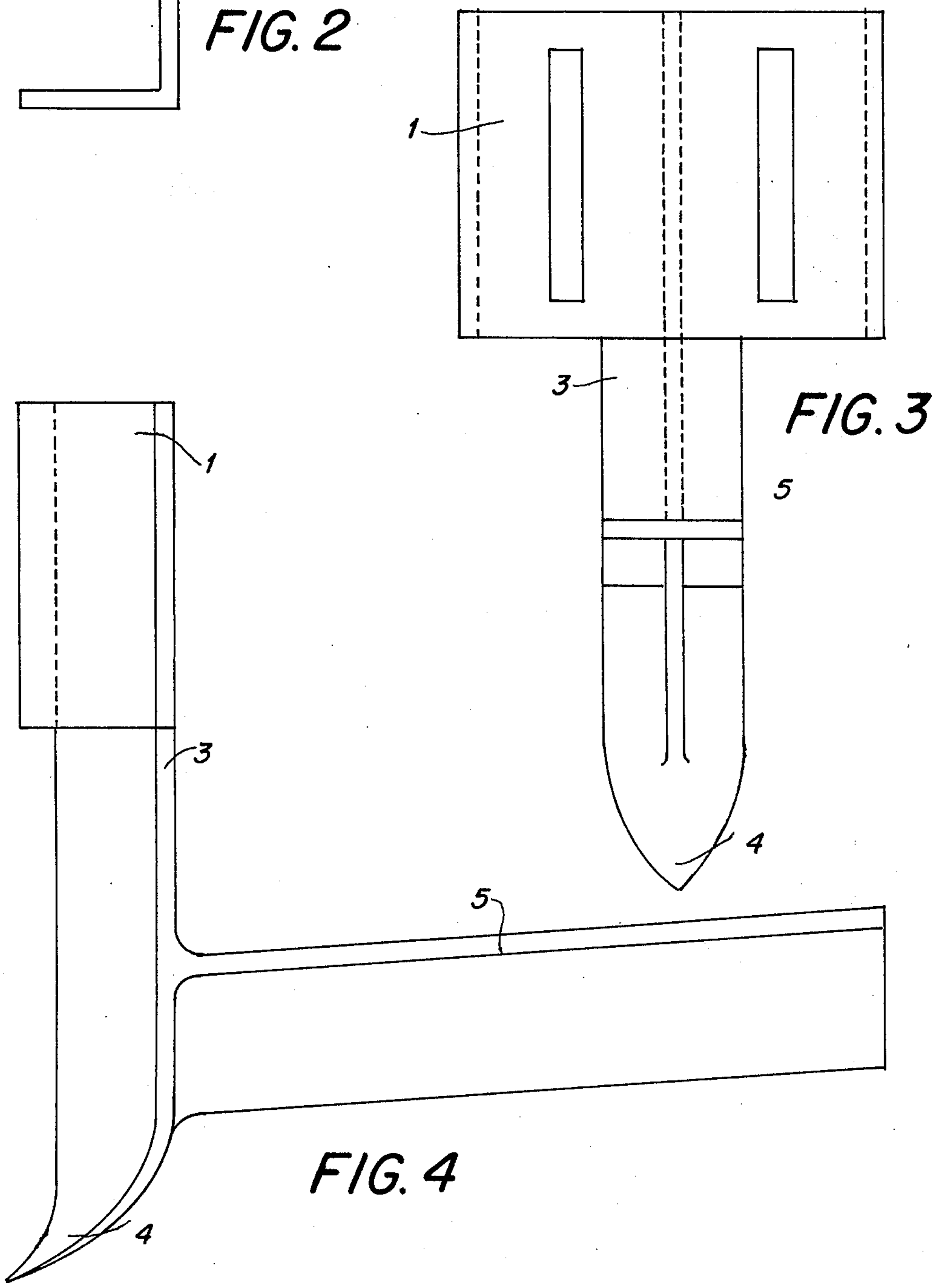
FIG. 3
FIG. 4

BELT-ON TREE STEP (BOTS)

Our invention is a device to be used in climbing up and down trees, poles, posts and other vertical or semi-vertical uprights. While principally intended for use with wooden uprights, it may also be used on metal or other non-wood uprights with minor modification, i.e. flattening of the spike.

The main object is to provide a device which is secured to the upright to be climbed by a belt, strap, rope, band or chain around the circumference of the upright. Thus secured, the device becomes a safe step for ascending and descending the upright. The step is prevented from slipping or "swinging" by a spike on the lower part of its shaft which is embedded into the wooden upright, or when made flat, creates friction against a non-wood upright.

The invention consists in detail of construction and arrangement of parts set forth in the following specifications:

Our invention consists of an angular step which may be fabricated from steel or other material; or, preferably, cast from a metallic alloy.

FIG. 2 is a top view of the step of FIG. 1,

FIG. 3 is a front view of the step of FIG. 1, and;

FIG. 4 is a side view of the step of FIG. 1.

Figure 1:
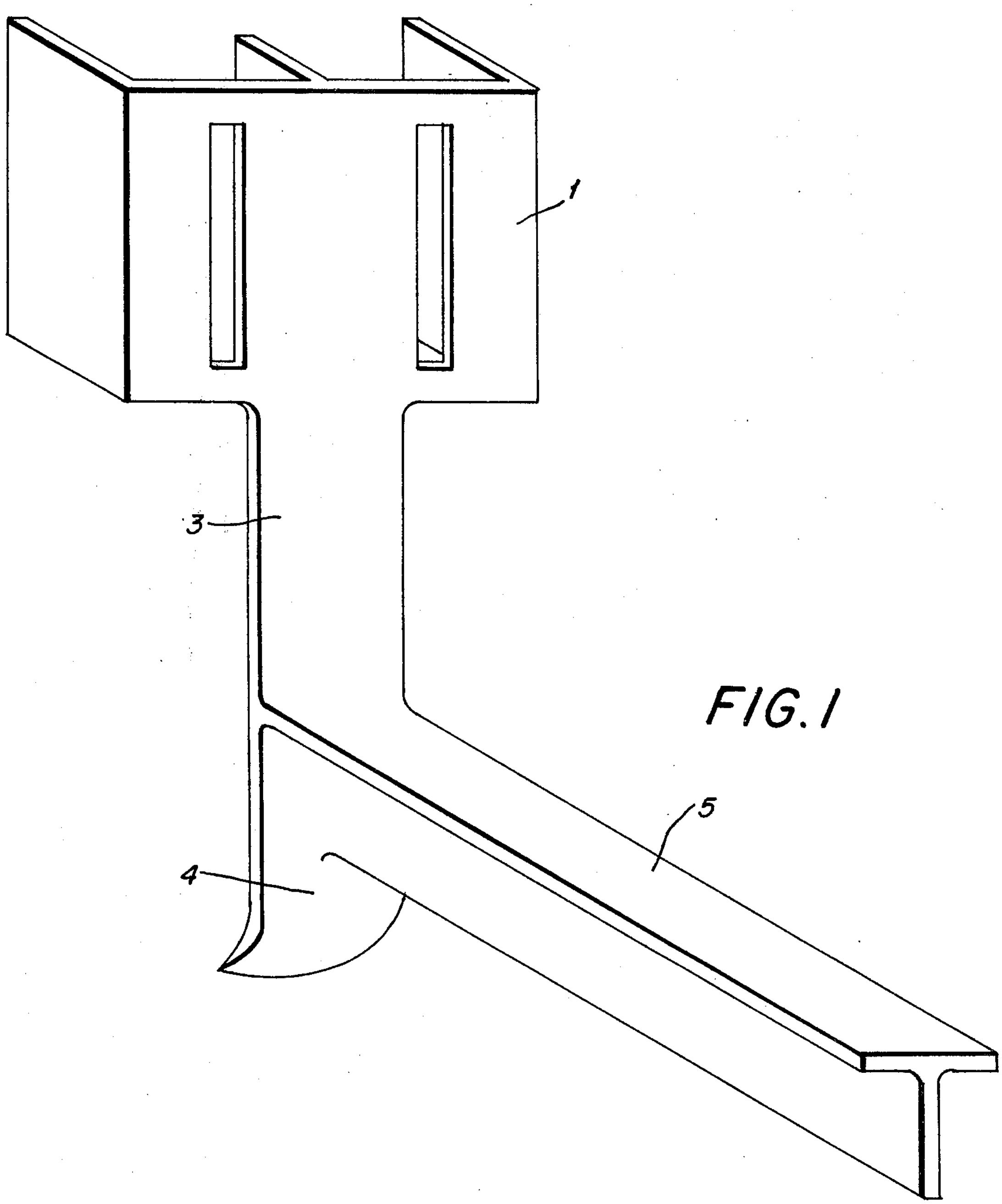
FIG. 1 is a perpective of the portable step.

Reference is now made to the accompanying drawing:

The step comprises a vertical leg portion 3 which is T-shaped in cross-section and having at its upper end a slotted cross arm 1 to accomodate either a belt, strap, band, chain or rope in order to secure the step to an upright support member. The lower end of said vertical leg portion 3 is formed into a spike 4 which will penetrate said upright member if made from wood and upon placing a weight on said step. In an alternative modification wherein the upright is non-wood said spike could be replaced with a flat surface to provide friction. Extending outwardly from said vertical leg portion 3, a step support 5 also T-shaped in cross-section as shown. This step support is at about 85° angle relative to the upper section of said leg portion 3 for preventing the hazard of slipping of the foot when placed on said support.

The principal use of our invention will be by hunters, to climb trees. Other potential users include forest industry, fruit growers, nurseries, utility companies, marine users, etc.

Having thus described the invention, what we claim is:

1. A portable step for climbing up and down elongated objects such as trees and poles, comprising, a one-piece member formed as an integral casting and having a first vertical leg portion which is T-shaped in cross-section with the leg of the T forming an abutment edge to abut against the adjoining surface of the elongated object to be climbed and with the cross arms of the T spaced outwardly thereof, said cross arms of the T at an upper portion of said vertical leg portion being enlarged to form an anchoring means and having formed therein a pair of spaced apart elongated slots through which may be passed a belt-type fastening means, thereby to anchor the member to the elongated object when the belt-type fastening means is encircled therearound, said anchoring means having offset flanges extending inwardly towards the elongated object and being disposed generally parallel to but spaced outwardly from the leg of the T and forming abutment edges engageable with the adjoining surface of the elongated object at spaced apart points to stabilize the member by multi-point engagement with the elongated object, said leg portion at the lower extremity thereof being offset and shaped and arranged to form a sharp spike extending inwardly beyond said abutment edge to embed itself into the adjoining surface of the elongated object, said one-piece member having a second generally horizontal leg portion which is also T-shaped in cross-section with the leg of the T extending downwardly and the cross arms of the T forming a flat step to support the foot of the user, said horizontal leg portion being inclined angularly upwardly sufficiently to prevent inadvertent foot slippage of the user, said horizontal leg portion being connected to said vertical leg portion immediately superjacent the level of said spike and well below the level of said anchoring means, whereby the step will not twist to the side when the user places his weight thereon.

* * * * *